(12) United States Patent
Bonnetti-Riffaud (10) Patent No.: US 8,475,896 B2
(45) Date of Patent: Jul. 2, 2013

(54) MULTILAYER FILM

(75) Inventor: Josyane Bonnetti-Riffaud, Quimper (FR)

(73) Assignee: Bollore, Ergue Gaberic (FR)

( * ) Notice: Subject to any disclaimer, the term of this patent is extended or adjusted under 35 U.S.C. 154(b) by 1152 days.

(21) Appl. No.: 11/988,118

(22) PCT Filed: Jun. 13, 2006

(86) PCT No.: PCT/EP2006/063151
§ 371 (c)(1),
(2), (4) Date: Feb. 5, 2009

(87) PCT Pub. No.: WO2007/003487
PCT Pub. Date: Jan. 11, 2007

(65) Prior Publication Data
US 2009/0214842 A1 Aug. 27, 2009

(30) Foreign Application Priority Data
Jul. 1, 2005 (FR) .................................. 05 07085

(51) Int. Cl.
*B32B 1/00* (2006.01)
*B32B 7/02* (2006.01)
*B32B 27/08* (2006.01)
*B32B 27/32* (2006.01)

(52) U.S. Cl.
USPC ........................... 428/35.7; 428/218; 428/518

(58) Field of Classification Search
USPC .................. 428/35.7, 213, 218, 516, 517
See application file for complete search history.

(56) References Cited

U.S. PATENT DOCUMENTS

| 4,436,888 | A | | 3/1984 | Copple |
| 4,532,189 | A | * | 7/1985 | Mueller ........................ 428/516 |
| 4,833,024 | A | | 5/1989 | Mueller |
| 4,865,902 | A | | 9/1989 | Golike et al. |
| 5,023,143 | A | | 6/1991 | Nelson |
| 5,212,246 | A | * | 5/1993 | Ogale ........................ 525/240 |
| 5,332,616 | A | | 7/1994 | Patrick et al. |
| 5,593,747 | A | * | 1/1997 | Georgelos .................... 428/36.7 |
| 5,614,315 | A | | 3/1997 | Kondo et al. |

(Continued)

FOREIGN PATENT DOCUMENTS

| CA | 2178459 | 12/1996 |
| EP | 0 107 819 A1 | 5/1984 |

(Continued)

OTHER PUBLICATIONS

Briston, John. Plastic Films. Hong Kong, Longman Scientific and Technical. 1986. pp. 24 and 25.*

(Continued)

*Primary Examiner* — Erik Kashnikow
(74) *Attorney, Agent, or Firm* — Pauley Petersen & Erickson (57) ABSTRACT

A film comprising a core layer (5), first and second outer layers (3, 4), first and second intermediate layers (1, 2). The core layer (5) contains at least 50% by weight of a ULDPE. At least one of the outer layers (3, 4) contains at least 50% by weight of a LLDPE. The first and/or second intermediate layer (1, 2) is made of a first composition based on EVA and on a copolymer of ethylene and of at least one compound selected from the group consisting of the linear alkenes of order C greater than ethylene, dienes and cyclic alkenes.

32 Claims, 4 Drawing Sheets

U.S. PATENT DOCUMENTS

| | | | |
|---|---|---|---|
| 5,677,044 A | 10/1997 | Beccarini et al. | |
| 5,707,751 A | 1/1998 | Garza et al. | |
| 6,150,011 A | 11/2000 | Bax et al. | |
| 6,344,250 B1 | 2/2002 | Arthurs | |
| 6,479,138 B1 | 11/2002 | Childress | |
| 6,579,584 B1 * | 6/2003 | Compton | 428/35.7 |
| 6,872,462 B2 | 3/2005 | Roberts et al. | |
| 2004/0033380 A1 * | 2/2004 | Bobovitch et al. | 428/515 |
| 2005/0070673 A1 * | 3/2005 | Novak et al. | 525/333.9 |

FOREIGN PATENT DOCUMENTS

| | | |
|---|---|---|
| EP | 0286 430 | 10/1988 |
| EP | 0 229 715 B1 | 5/1992 |
| EP | 0 285 444 B1 | 11/1994 |
| EP | 0 662 989 B1 | 1/1997 |
| EP | 0 388 177 B1 | 8/1998 |
| EP | 0 885 717 A2 | 12/1998 |
| EP | 0 797 507 B1 | 6/1999 |
| EP | 1 110 715 A1 | 6/2001 |
| EP | 1 332 868 * | 4/2002 |
| EP | 0 809 573 B1 | 10/2002 |
| EP | 1 251 002 A1 | 10/2002 |
| GB | 2 233 934 A | 1/1991 |
| WO | WO 94/07954 | 4/1994 |
| WO | WO 97/38857 | 10/1997 |
| WO | WO 02/068195 A1 | 9/2002 |
| WO | WO 2004/012938 A1 | 2/2004 |

OTHER PUBLICATIONS

Kissin, Y. V. 2005. Polyethylene, Linear Low Density. Kirk-Othmer Encyclopedia of Chemical Technology. Apr. 2005.*

Kontopoulou, et al., Rheology, Structure, and Properties of Ethylene-Vinyl Acetate/Metallocene-Catalyzed Ethylene-α-Olefin Copolymer Blends, Journal of Applied Polymer Science, vol. 94, (2004) pp. 881-889.

* cited by examiner

MULTILAYER FILM

BACKGROUND OF THE INVENTION

1. Field of the Invention

The invention relates to a multi-layer film.

The films that the invention relates to are soft films, i.e., films capable of high shrinkage while exerting low force.

A field of application for these films is the packaging of objects, in particular fragile or flexible objects that must not be deformed. A particular field of the invention is thermoshrinkable films that can be heat-sealed. The film is also intended for polyvalent use, for flexible or rigid objects and for various sealing systems.

2. Discussion of Related Art

One of the problems of these films is that it is difficult to reconcile such properties of flexibility with the imperatives and constraints of manufacturing on the industrial scale.

Indeed, the properties of current films are often obtained to the detriment of their manufacturing cost, principally due to the cost of the raw materials used to form the various layers.

It is therefore desired and sought to select relatively low cost materials.

At the same time, the films must be easy to manufacture and treat. They must in particular have improved properties of stretching and bi-orientation in the longitudinal direction and in the transverse direction and a high manufacturing rate.

Upon use, the films must also have good heat-sealing properties and it is necessary to prevent the heat-sealed film from delaminating.

The film must retain, insofar as possible, very good optical properties.

SUMMARY OF THE INVENTION

The invention aims at obtaining a film that satisfies these requirements to a great extent.

To this end, a first object of the invention is a film comprising a polyethylene-based core layer, first and second polyethylene-based outer layers on both sides of the core layer, at least one first intermediate layer between the core layer and the first outer layer and at least one second intermediate layer between the core layer and the second outer layer, characterized in that the core layer contains at least 50% by weight of a ULDPE polyethylene, at least one of the first and second outer layers contains at least 50% by weight of a LLDPE polyethylene, and the first and/or second intermediate layer is made of a first composition based on EVA and a copolymer of ethylene and at least one second compound selected from the group consisting of linear alkenes of order $C_n$ greater than ethylene, dienes and cyclic alkenes.

The film according to the invention desirably has a moderate raw materials cost, with properties having a favorable impact on its manufacture and use, including:

low to medium shrinkage and cohesion forces, low shrinkage energy, and in particular properties of shrinkage at low temperature for fragile objects, broad shrinkage range, high elongation at rupture, high free shrinkage, high shrinkage speed, high elongation of the sealing, and high mechanical resistance of the sealing.

BRIEF DESCRIPTION OF THE DRAWINGS

The invention will be better understood upon reading the following description, given solely by way of non-restrictive example with reference to the appended drawings, in which.

DETAILED DESCRIPTION OF THE INVENTION

Figure 1:
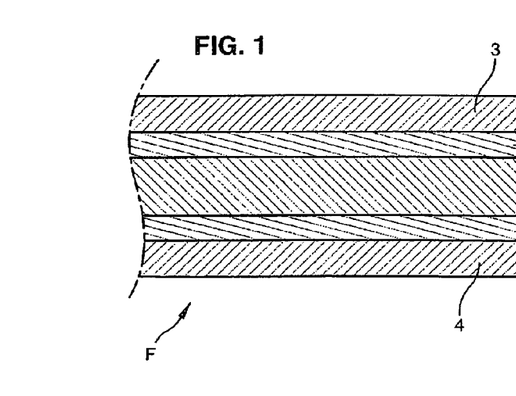
FIG. 1 shows an embodiment of a film according to the invention, seen in the direction of its thickness.

In FIG. 1, a first upper intermediate layer 1 is found on the central core layer 5 and a second lower intermediate layer 2 is found under central core layer 5. On the first upper intermediate layer 1, a first outer layer 3 is found, forming the upper surface of film F. On the second lower intermediate layer 2 a second outer layer 4 is found, forming the lower surface of film F. Of course, multiple superimposed intermediate layers 1 could be provided between layer 5 and layer 3 and/or multiple superimposed intermediate layers 2 could be provided between layer 5 and layer 4.

This film F is manufactured for example by a double-bubble method during which a cylindrical sheath is produced, as is known by those skilled in the art. The double-bubble method takes place in the following manner: a first cylindrical sheath, referred to as primary, is moistened with water for cooling, and then brought up high, for example to 20 meters in height. It is then reheated in ovens to reach a predetermined orientation temperature. Then, the sheath is inflated with air injected through the bottom. The bubble thus obtained is closed through the bottom by "nipps" and is cut on two sides by two blades in order to obtain two separate films F, which are rolled onto rollers. Film F possesses a longitudinal direction or machine direction, which is its rolling direction onto the roller during its manufacture and a transverse direction parallel to the axis of the roller.

The film according to the invention may serve for packaging of any type of object, flexible or rigid. One preferred use of the film according to the invention is as a packaging film closed by heat-sealing around one or more objects.

The composition of core layer 5 is such that it has a lower melting point than the melting point(s) of the outer layers. In this way, the core layer melts at least partially before the outer layers during fabrication of the film. This low melting point of the core layer is for example lower than 100° C.

The intermediate layer(s) 1 and/or 2 are of a composition having a melting point lower than the melting point(s) of the outer layers. In this way, the intermediate layer(s) 1 and/or 2 can melt at least partially and preferably totally before the outer layers during manufacture of the film. This low melting point of the intermediate layer(s) 1 and/or 2 is for example less than 100° C.

Embodiments of layers 1, 2, 3, 4, 5 are the following:

the second compound of the first and/or second intermediate layer 1, 2 is selected from the alkenes of order $C_n$ greater than or equal to 4;

the second compound of the first and/or second intermediate layer 1, 2 is selected from the group consisting of propylene, butene, pentene, hexene, heptene, and octene;

the second compound of the first and/or second intermediate layer 1, 2 contains propylene and/or ethylidene norbornene;

the first and/or second intermediate layer 1, 2 is made of a first composition based on EVA and a copolymer of ethylene and butene;

said first and/or second intermediate layer 1, 2 is made of a first composition based on EVA and a copolymer of ethylene and octene;

the copolymer of ethylene and the second compound is an impact modified heterophasic copolymer;

the copolymer of ethylene and the second compound contains an impact modified heterophasic mixture of polypropylene with a copolymer of ethylene and propylene;

the proportion by weight of vinyl acetate in the EVA of the first and/or second intermediate layer 1, 2 is less than or equal to 10% and for example less than 6%;

the thickness of the first and/or second intermediate layer 1, 2 is less than the thickness of the first and/or second outer layer 3, 4 and is less than the thickness of core layer 5;

the thickness of the first or second intermediate layer 1, 2 is less than 15% of the total thickness of the film;

the thickness of the core layer is greater than or equal to 30% of the total thickness of the film;

the thickness of the first outer layer 3 and/or the second outer layer 4 is between 15% and 30% of the total thickness of the film;

the proportion by weight of the copolymer of ethylene and the second compound in the first and/or second intermediate layer 1, 2 is greater than or equal to 10%; this proportion is for example greater than or equal to 20% and less than or equal to 60%, and more preferably less than or equal to 50%;

the core layer 5 is made of polyethylene of density less than or equal to that of an LLDPE, and at least one of the first and second outer layers 3, 4 is of density greater than that of the core layer 5;

the core layer 5 is made of ULDPE, and at least one of the first and second outer layers 3, 4 is made of LLDPE;

the core layer 5 also contains a copolymer of ethylene and at least one second compound selected from the group consisting of linear alkenes of order $C_n$ greater than ethylene and the cyclic alkenes. This second compound present in this case in the core layer may be the same as that present in intermediate layer 1 and/or 2 or be another from the group mentioned above;

the film is reticulated by irradiation; and anti-blocking agents may be added to the outer layers and/or sliding agents may be added to the outer and/or intermediate and/or core layers.

The definitions of the terms used are the following:

a copolymer is a polymer of two or more than two monomers;

EVA is the copolymer of ethylene/vinyl acetate;

ULDPE or VLDPE are Ultra Low Density Polyethylene or Very Low Density Polyethylene, having a density less than or equal to 0.910 g/cm$^3$ and greater than or equal to 0.860 g/cm$^3$;

LLDPE is Linear Low Density Polyethylene of density greater than or equal to 0.911 g/cm$^3$ and less than 0.925 g/cm$^3$;

LMDPE is Linear Medium Density Polyethylene of density greater than or equal to 0.926 g/cm$^3$ and less than 0.939 g/cm$^3$; and HDPE is High Density Linear Polyethylene of density greater than or equal to 0.940 g/cm$^3$ and less than 0.97 g/cm$^3$.

Examples of embodiments of the film according to the invention are described below with their properties presented in the table below. In these examples, the proportions are given by weight. The indicated parameters are measured in the following way, according to the methods and standards customarily used.

Haze: standard ASTM D1003.

Gloss: standard ASTM D523.

Resistance to rupture and elongation at rupture: standard ASTM D882.

Energy Perforation: Energy necessary to pierce the film, standard NFT 54-198.

Shrink force: Force exerted during film shrinkage, according to standard NFT 54-125.

Cohesion force: Force exerted after shrinkage of the film, in the cold, according to standard NFT 54-125.

Shrinkage speed: according to standard NFT 54-125.

Resistance to Elmendorf tearing: standard ISO 6383-2.

Figure 4:
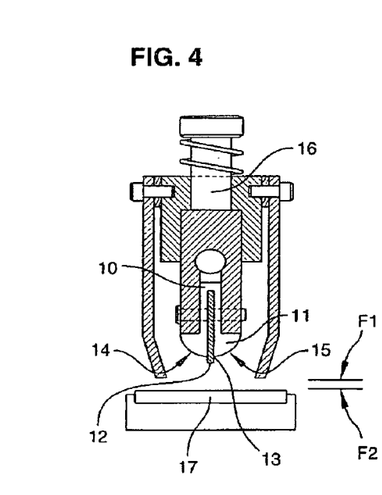
FIG. 4 shows in longitudinal section an example of a sealing device used to measure parameters of the film according to the invention.
Figure 5:
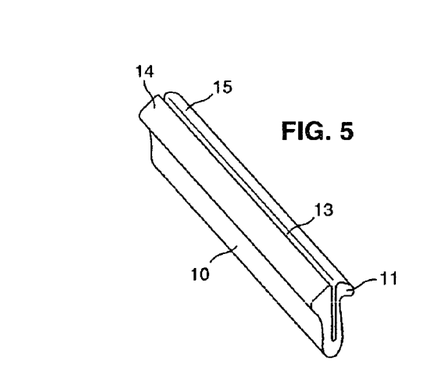
FIG. 5 shows in perspective a knife-holder bar used to carry out sealing and sectioning of the film in the device according to FIG. 4, the bar being shown head up in FIG. 5, instead of being shown head down as in FIG. 4.
Figure 6:
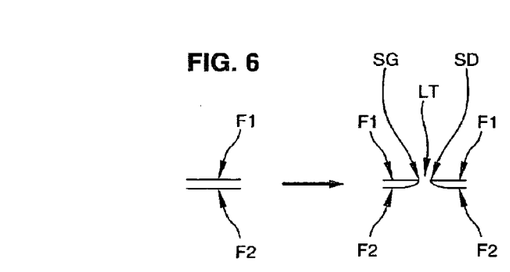
FIG. 6 shows the films in longitudinal section before, and then after the sealing carried out by the device according to FIG. 4.

Mushroom type mechanical resistance and elongation of sealing: resistance and elongation measured on a broad sealing of the film, carried out at 195° C. for one second under a pressure of 35 psi (i.e., 241325 Pa) in the transverse direction of the film by a sealing device of the Shanklin bar type, the broad type Shanklin, or the Reynolds type, referred to here as "Mushroom," shown in FIGS. 4 to 6.

This sealing device comprises a transverse bar 10 with a profile in the shape of a mushroom in longitudinal section, comprising a sealing head 11. A knife 12 is inserted and fixed in a transverse and central groove 13 of head 11, leaving on both sides of the knife 12 two application surfaces 14, 15 of the head 11. The head 11 is held in a mobile arm 16. To carry out the Mushroom sealing, insertion and immobilization is made of two films F1 and F2 superimposed between the device and the counter-bar 17, with bar 10 extending in the transverse direction of films F1, F2. These two films F1, F2 may be a folded film F or two identical superimposed films F. Then, the head and the knife being heated to the sealing temperature indicated, head 11 and knife 12 are lowered onto films F1, F2 against counter-bar 17 with the pressure indicated and the duration indicated, as indicated by the arrow in FIG. 6, which cuts films F1, F2 in two along a transverse line LT and seals, by left 14 and right 15 surfaces, films F1 and F2 along two sealing cords, left SG and right SD, with respect to section line LT. The quality of the sealings of the films F1 and F2 thus sealed is then evaluated by a traction trial according to standard NFT 54-122 to determine the mechanical resistance of the Mushroom sealing and the elongation of the Mushroom sealing.

Elongation and mechanical resistance of low pressure sealing: elongation and mechanical resistance measured on film sealing in the longitudinal direction. To carry out sealing, two superimposed thicknesses of the film are passed on a heated knife extending longitudinally. The very rapid contact of the two superimposed films on the heated longitudinal knife cuts and seals the two thicknesses of the film in a way similar to FIG. 6 when this is viewed no longer in longitudinal section but in transverse section, the sealing extending longitudinally perpendicular to the plane of the drawing. In the first method indicated in the table, the low pressure sealings have been carried out on a laboratory apparatus simulating continuous sealing machines without pressure on the blade. These continuous sealing systems are equipment on automatic packaging machines of Beck, BVM, Kallfass and Hugo Beck. For the test, the temperature measured at the notch of the knife is 200° C. and the speed of passage over this knife is 10 meters per minute, the usual rate of the above-mentioned machines is 30 to 40 meters per minute. The quality of the sealings of films sealed in this way is then evaluated by a traction trial according to standard NFT 54-122 to determine the mechanical resistance of low pressure sealing and the elongation of low pressure sealing.

Free shrink: standard NFT 54-115.

In examples 1 to 6, the thickness ratio of the layers taken from top to bottom (upper outer layer-upper intermediate layer-core layer-lower intermediate layer-lower outer layer) is, as a percentage of total film thickness: 18%-12%-40%-12%-18%.

Example 1 and 4

The outer layers are made of LLDPE at 0.914 g/cm$^3$ density.

The intermediate layers are made of a mixture of 80% EVA at 5% vinyl acetate, and 20% ethylene and butene copolymer at 0.885 g/cm$^3$ density.

The core layer is made of ULDPE at 0.905 g/cm$^3$ density.

Example 2

The outer layers are made of LLDPE at 0.914 g/cm$^3$ density.

The intermediate layers are made of a mixture of 80% EVA at 5% vinyl acetate, and 20% of an impact modified heterophasic mixture of polypropylene with a copolymer of ethylene and propylene (this mixture is for example a supersupersoft HECO catalloy, i.e., a heterophasic copolymer produced by the Catalloy process) at 0.870 g/cm$^3$ density.

The core layer is a mixture of 80% ULDPE at 0.905 g/cm$^3$ density, and 20% impact modified heterophasic mixture of polypropylene with copolymer of ethylene and propylene at 0.870 g/cm$^3$ density of the intermediate layers.

Example 3

The outer layers are made of LLDPE at 0.914 g/cm$^3$ density.

The intermediate layers are made of a mixture of 80% EVA at 5% vinyl acetate, and 20% of an ethylene-propylene-ethylidene norbornene at 0.88 g/cm$^3$ density.

The core layer is made of a mixture of 80% of ULDPE at 0.905 g/cm$^3$ density, and 20% ethylene-propylene-ethylidene norbornene terpolymer at 0.88 g/cm$^3$ density of the intermediate layers.

Example 5

The outer layers are made of LLDPE at 0.914 g/cm$^3$ density.

The intermediate layers are made of a mixture of 50% EVA at 5% vinyl acetate, and 50% copolymer of ethylene and butene at 0.885 g/cm$^3$ density.

The core layer is made of ULDPE at 0.905 g/cm$^3$ density.

Example 6

The outer layers are made of LLDPE at 0.914 g/cm$^3$ density.

The intermediate layers are made of a mixture of 80% EVA at 5% vinyl acetate, and 20% ethylene and octene copolymer at 0.885 g/cm$^3$ density.

The core layer is made of ULDPE at 0.905 g/cm$^3$ density.

| Examples | 1 | 2 | 3 | 4 | 5 | 6 |
|---|---|---|---|---|---|---|
| Average thickness (μm) | 16 to 18 | 16 to 18 | 16 to 18 | 14 to 16 | 14 to 16 | 14 to 16 |
| Haze | 3.6 | 3.5 | 3 | 4.5 | 4.5 | 4.6 |
| 20° Gloss | 110 | 115 | 123 | 115 | 109 | 109 |
| Resistance to rupture (daN/mm$^2$) | 10.5 | 9 | 9 | 9.5 | 8.5 | 9.8 |
| Elongation at rupture (%) | 149.5 | 140 | 129 | 135.5 | 156.5 | 127.5 |
| Resistance to Elmendorf tearing (mN/μm) | 8 | 4.2 | 5.7 | 4.6 | 5.52 | 4.9 |
| Energy Perforation (mJ/μm) | 51 | 39 | 45 | 46 | 52 | 58 |
| Shrink force (10$^{-1}$ MPa) | 24 | 23.5 | 24 | 19.3 | 16.3 | 20 |
| Cohesion force (10$^{-1}$ MPa) | 5 | 4 | 4 | 4 | 3 | 7 |
| Shrinkage speed (%/s) | 25 | 18 | 20 | 22 | 23 | 22 |
| Mechanical resistance of MUSHROOM sealing (N) | 27.5 | 25 | 23 | 23.6 | 18.6 | 21.3 |

-continued

| Examples | 1 | 2 | 3 | 4 | 5 | 6 |
|---|---|---|---|---|---|---|
| Elongation of MUSHROOM sealing (%) | 91.8 | 69 | 69 | 68.6 | 64.2 | 63.2 |
| Low pressure elongation of sealing (%) | 63.3 | 54.4 | 48 | 57 | 90 | 50.9 |
| Low pressure mechanical resistance of sealing (N) | 24.2 | 22 | 21 | 21.1 | 18.5 | 19.9 |

Figure 2:
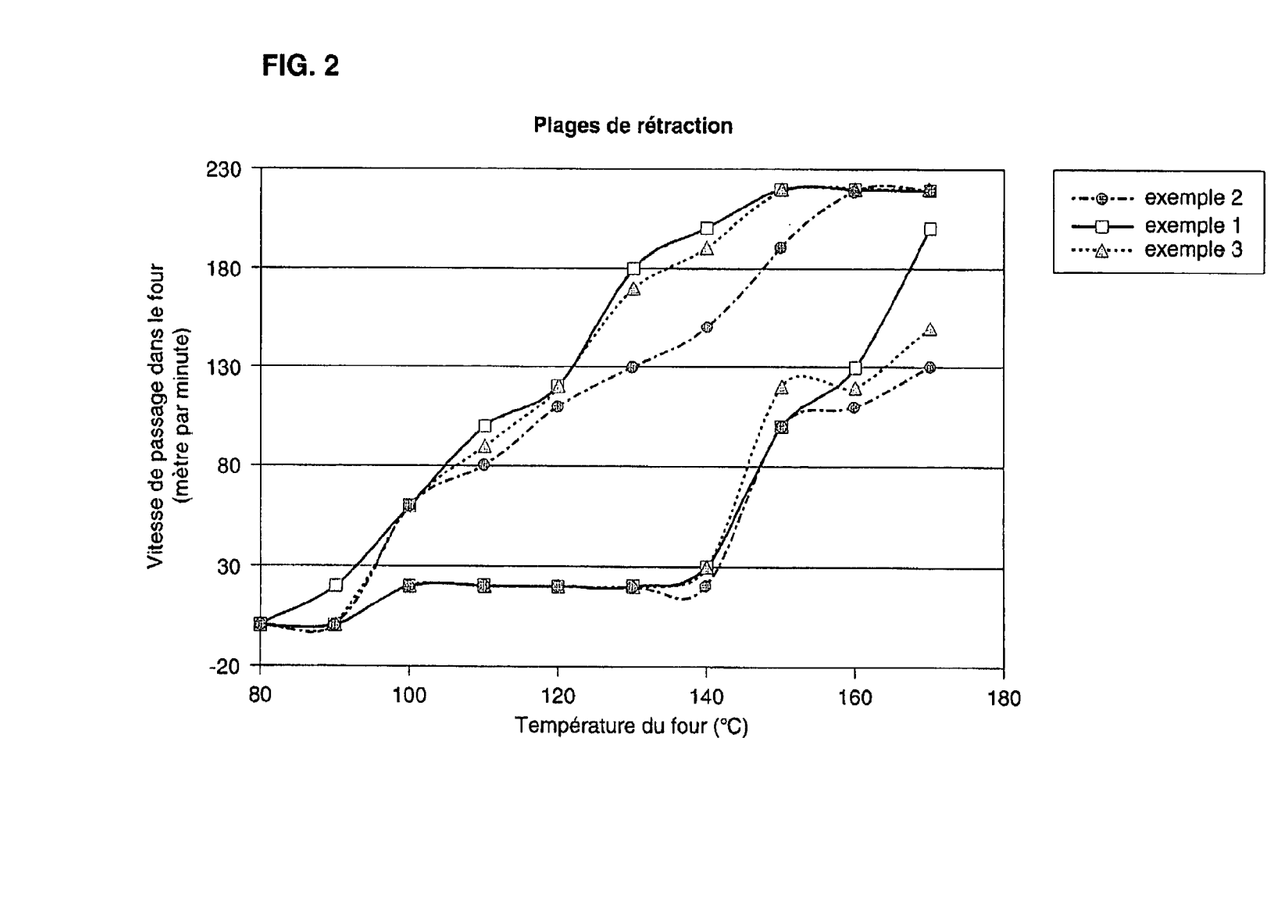
FIG. 2 is a graph showing, for various examples of films according to the invention, the shrinkage ranges as a function of the temperature, for a given oven temperature into which the film passes, the range of passage speed that this film supports, so that the film retracts around an object while giving an appropriate aesthetic appearance and without burning.

The FIG. 2 gives the range of shrinkage in temperature and in speed of passage in an oven heated to this temperature for examples 1, 2 and 3. For each of these examples, FIG. 2 indicates, for various temperatures, a point of high speed and a point of low speed, which represent respectively the maximum and minimum values of speed at these temperatures. Each example therefore possesses a high speed curve joining the high speed points and a low speed curve joining the low speed points. The ranges of shrinkage in temperature and in speed of passage of each example are shown by the deviation between the high speed curve and the low speed curve in this example.

Figure 3:
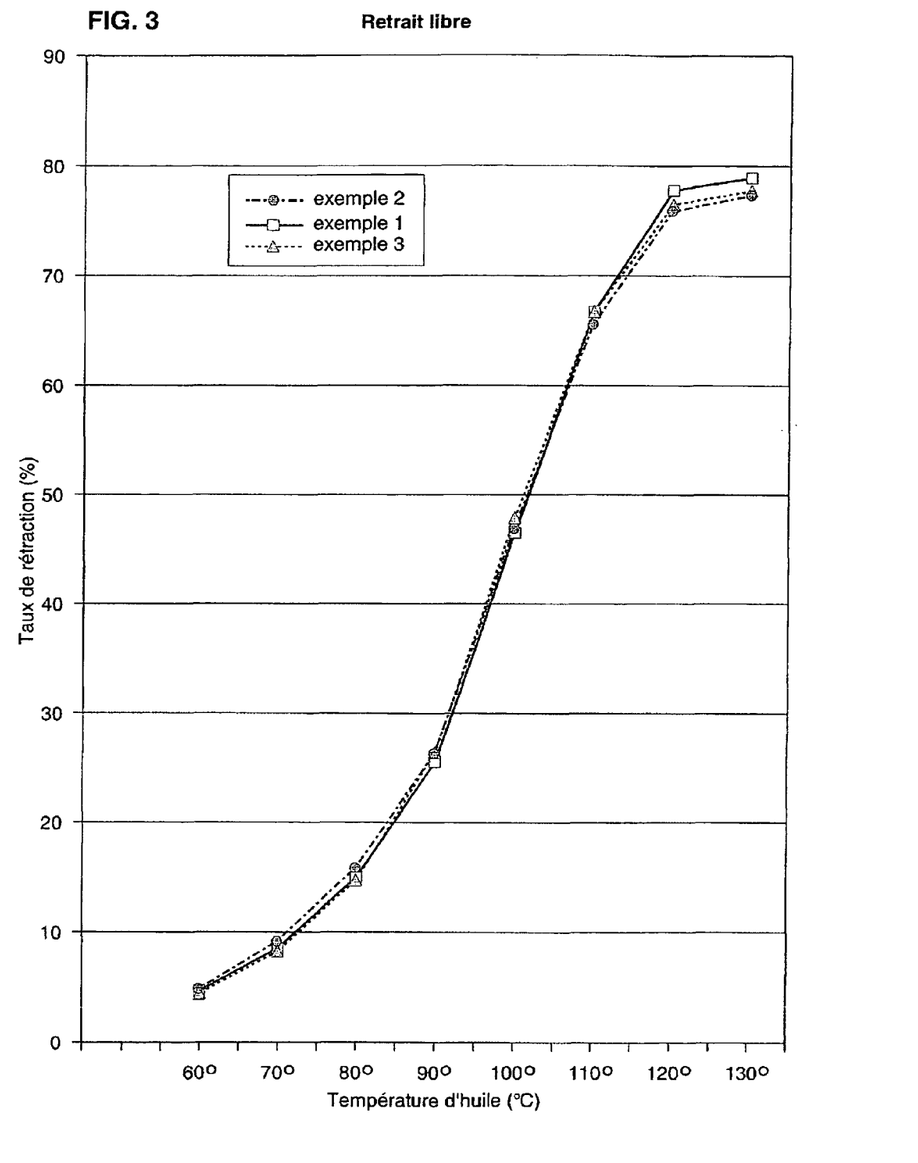
FIG. 3 is a graph representing, for various examples of films according to the invention, the shrinkage ratio as a function of the temperature of the oil in which the film is immersed.

FIG. 3 gives the free shrink of examples 1, 2 and 3 as a function of temperature.

Measurements of elongation and mechanical resistance have also been carried out on low pressure sealing that was carried out as indicated above, but according to a second method on a Kallfass, Universa 400T machine, with a blade temperature of 200° C. and a speed of passage of 20 to 25 meters per minute.

Figure 7:
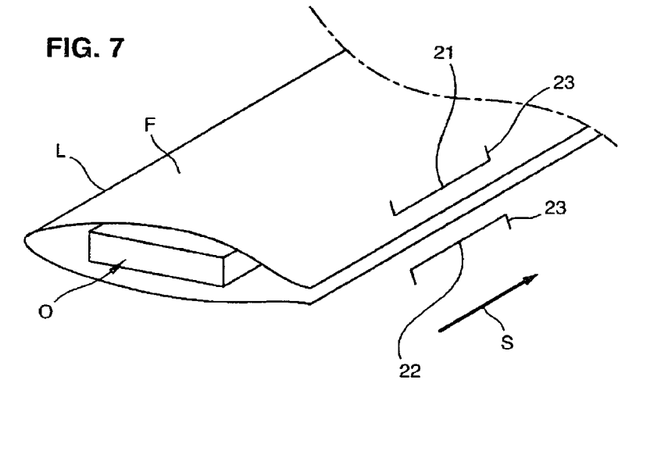
FIG. 7 shows schematically in perspective a sealing system used to evaluate the quality of the sealing of the film according to the invention.
Figure 8:
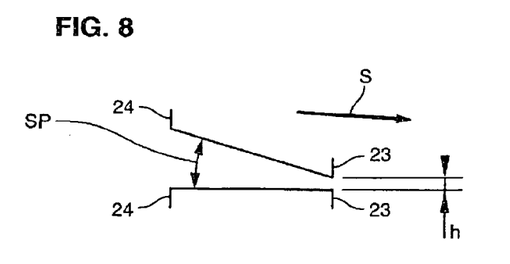
FIG. 8 shows schematically in longitudinal section the sealing wires used in the sealing system of FIG. 7.

A third method of low pressure sealing used a Shanklin HS-3 machine, comprising an upper longitudinal hot wire 21 and a lower longitudinal hot wire 22, as is shown in FIGS. 7 and 8. Film F, folded over by a longitudinal bend line L located on the other side of wires 21, 22 into two superimposed thicknesses is passed between the wires 21, 22 at a speed of 30 to 35 meters per minute in the longitudinal direction. Passage section SP between the two wires 21 and 22 narrows in the S direction of the film advance from inlet 24 to outlet 23 in the longitudinal direction, to have a height H of approximately 1 mm at outlet 23 of wires 21, 22. The sealing temperature at inlet 24 and outlet 23 is adjusted by two potentiometers graduated in an increasing way as a function of the intensity of heating and the temperature obtained.

Such a machine is usually used in production for surrounding an object O to be packaged between the two thicknesses of the film. For known reticulated films, the potentiometers for adjustment of the temperature of the inlet 24 and of the outlet of wires 21, 22 are usually adjusted between 60 and 85.

For the measurement of the elongation and the mechanical resistance of the low pressure sealing of the film according to the invention according to the third method, the potentiometer for adjustment of the temperature of inlet 24 is set at 30 on the "Low Heat" position, whereas the potentiometer for adjustment of the temperature of the outlet 23 is set at 50, the "High Heat" position.

Satisfactory continuous sealings were carried out according to this third method, on the film according to the invention, therefore with lower temperature sealings than with reticulated films of the state of the art, even if the third sealing method is very critical on account of the very low intensities of heating of the wires and the very high passage speeds.

The table below gives the measured values according to standard NFT 54-122 for the elongation and the mechanical resistance of the low pressure sealing carried out according to the second and third methods.

|  |  | Second Method | Third Method |
|---|---|---|---|
| Example 1 | Mechanical resistance of low pressure sealing (N) | 22 | 17.3 |
| Example 1 | Elongation of low pressure sealing (%) | 41 | 29.5 |
| Example 4 | Mechanical resistance of low pressure sealing (N) | — | 8.8 |
| Example 4 | Elongation of low pressure sealing (%) | — | 17.4 |

According to another embodiment of the invention, to increase the modulus of elasticity of the film and the resistance to tearing, the core layer contains, in addition to the ULDPE polyethylene, LMDPE or mMDPE (m for metallocene) polyethylene in a proportion of 20% to 50% by weight, more preferably from 20% to 40%, and in particular from 20% to 35% to not overly increase the shrink and cohesion forces, and for example 30% in one example of embodiment.

In addition, at least one of the first and second outer layers 3, 4 can contain, in addition to LLDPE polyethylene, polyethylene manufactured by metallocene catalyst.

The invention claimed is:

1. A soft film comprising a polyethylene-based core layer, first and second polyethylene-based outer layers on either side of the core layer, at least one first intermediate layer between the core layer and the first outer layer and at least one second intermediate layer between the core layer and the second outer layer, wherein:
   the core layer contains at least 50% by weight of a ULDPE polyethylene,
   at least one of the first and second outer layers contains at least 50% by weight of a LLDPE polyethylene,
   said first and/or second intermediate layer is made of a first composition based on an ethylene vinyl acetate copolymer and a copolymer of ethylene and at least one second compound selected from the group consisting of linear alkenes of order $C_n$ greater than ethylene, dienes and cyclic alkenes, wherein the proportion by weight of the copolymer of ethylene and of the second compound in the first and/or second intermediate layer is greater than or equal to 10% and less than 50%,
   the thickness of said first or second intermediate layer is less than 15% of the total thickness of the film, and
   the melting point of the core layer and of said first and second intermediate layers are each less than 100° C.

2. The film of claim 1, wherein:
the core layer possesses a lower melting point than that of the outer layers.
3. The film of claim 1, wherein:
said first and/or second intermediate layer possesses a melting point lower than that of the outer layers.
4. The film of claim 1, wherein:
the proportion by weight of vinyl acetate in the ethylene vinyl acetate copolymer of said first and/or second intermediate layer is less than or equal to 10%.
5. The film of claim 1, wherein:
the thickness of said first and/or second intermediate layer is less than the thickness of the first and/or second outer layer and is less than the thickness of the core layer.
6. The film of claim 1, wherein:
the thickness of the core layer is greater than or equal to 30% of the total thickness of the film.
7. The film of claim 1, wherein:
the thickness of the first outer layer and/or of the second outer layer is between 15% and 30% of the total thickness of the film.
8. The film of claim 1, wherein:
the thickness ratio of, respectively, the first outer layer, the first intermediate layer, the core layer, the second intermediate layer and the second lower outer layer is, as a percentage of the total thickness of the film: 18%-12%-40%-12%-18%.
9. The film of claim 1, wherein:
the core layer comprises polyethylene of density less than or equal to that of an LLDPE, and
at least one of the first and second outer layers is of density greater than that of the core layer.
10. The film of claim 1, wherein:
the ULDPE polyethylene is of density less than or equal to $0.910 \text{ g/cm}^3$, and
the LLDPE polyethylene is of density greater than or equal to $0.911 \text{ g/cm}^3$ and less than $0.925 \text{ g/cm}^3$.
11. The film of claim 1, wherein:
the core layer further comprises a copolymer of ethylene and at least one second compound selected from the group consisting of linear alkenes of order $C_n$ greater than ethylene and cyclic alkenes.
12. The film of claim 1, wherein:
the core layer consists essentially of ULDPE, and
at least one of the first and second outer layers consists essentially of LLDPE.
13. The film of claim 1, wherein:
said second compound is selected from the alkenes of order $C_n$ greater than or equal to 4.
14. The film of claim 1, wherein:
said second compound is selected from the group consisting of propylene, butene, pentene, hexene, heptene and octene.
15. The film of claim 1, wherein:
said first and/or second intermediate layer is made of a first composition based on an ethylene vinyl acetate copolymer and a copolymer of ethylene and butene.
16. The film of claim 1, wherein:
the outer layers are made of LLDPE at $0.914 \text{ g/cm}^3$ density,
the intermediate layers are made of a mixture of 80% of an ethylene vinyl acetate copolymer at 5% vinyl acetate, and 20% of a copolymer of ethylene and butene at $0.885 \text{ g/cm}^3$ density, and
the core layer is an ULDPE at $0.905 \text{ g/cm}^3$ density.
17. The film of claim 1, wherein:
the outer layers are made of LLDPE at $0.914 \text{ g/cm}^3$ density,
the intermediate layers are made of a mixture of 50% of an ethylene vinyl acetate copolymer at 5% vinyl acetate, and 50% of a copolymer of ethylene and butene at $0.885 \text{ g/cm}^3$ density, and
the core layer is made of ULDPE at $0.905 \text{ g/cm}^3$ density.
18. The film of claim 1, wherein:
said first and/or second intermediate layer is made of a first composition based on an ethylene vinyl acetate copolymer and a copolymer of ethylene and octene.
19. The film of claim 1, wherein:
the outer layers are made of LLDPE at $0.914 \text{ g/cm}^3$ density,
the intermediate layers are made of a mixture of 80% of an ethylene vinyl acetate copolymer at 5% vinyl acetate, and 20% of a copolymer of ethylene and octene at $0.885 \text{ g/cm}^3$ density, and
the core layer is made of ULDPE at $0.905 \text{ g/cm}^3$.
20. The film of claim 1, wherein:
said second compound contains propylene and/or ethylidene norbornene.
21. The film of claim 1, wherein:
the outer layers are made of LLDPE at $0.914 \text{ g/cm}^3$ density,
the intermediate layers are made of a mixture of 80% of an ethylene vinyl acetate copolymer at 5% vinyl acetate, and 20% of a terpolymer of ethylene-propylene-ethylidene norbornene at $0.88 \text{ g/cm}^3$ density, and
the core layer is made of a mixture of 80% ULDPE at $0.905 \text{ g/cm}^3$ density, and 20% of a terpolymer of ethylene-propylene-ethylidene norbornene at $0.88 \text{ g/cm}^3$ density of the intermediate layers.
22. The film of claim 1, wherein:
the copolymer of ethylene and of the second compound is an impact modified heterophasic copolymer.
23. The film of claim 1, wherein:
the copolymer of ethylene and the second compound contains an impact modified heterophasic mixture of polypropylene with a copolymer of ethylene and propylene.
24. The film of claim 1, wherein:
the outer layers are made of LLDPE at $0.914 \text{ g/cm}^3$ density,
the intermediate layers are made of a mixture of 80% of an ethylene vinyl acetate copolymer at 5% vinyl acetate, and 20% of an impact modified heterophasic mixture of polypropylene with a copolymer of ethylene and propylene at $0.870 \text{ g/cm}^3$ density, and
the core layer is made of a mixture of 80% ULDPE at $0.905 \text{ g/cm}^3$ density, and 20% of the impact modified heterophasic mixture of polypropylene with the copolymer of ethylene and propylene at $0.870 \text{ g/cm}^3$ density of the intermediate layers.
25. The film of claim 1, wherein:
at least one of the first and second outer layers contains, in addition to the LLDPE polyethylene, polyethylene manufactured by metallocene catalyst.
26. The film of claim 1, wherein:
the core layer contains, in addition to the ULDPE polyethylene, LMDPE or mMDPE polyethylene of 20% to 50% by weight.
27. The film of claim 1, wherein:
the core layer contains, in addition to the ULDPE polyethylene, LMDPE or mMDPE polyethylene of 20% to 35% by weight.
28. The film of claim 1, wherein:
the film is reticulated by irradiation.

29. The film of claim 1, wherein:
the proportion by weight of the copolymer of ethylene and of the second compound in the first and/or second intermediate layer is greater than or equal to 20%.

30. A method of packaging an object, said method comprising:
applying at least one thickness of the film of claim 1 around the object.

31. A method of packaging one or more objects, said method comprising heat-sealing a film of claim 1 around the one or more objects.

32. A film comprising a polyethylene-based core layer, first and second polyethylene-based outer layers on either side of the core layer, at least one first intermediate layer between the core layer and the first outer layer and at least one second intermediate layer between the core layer and the second outer layer, wherein:
the core layer contains at least 50% by weight of a ULDPE polyethylene,
at least one of the first and second outer layers contains at least 50% by weight of a LLDPE polyethylene,
said first and/or second intermediate layer is made of a first composition based on an ethylene vinyl acetate copolymer and on a copolymer of ethylene and of at least one second compound selected from the group consisting of linear alkenes of order $C_n$ greater than ethylene, dienes and cyclic alkenes, wherein the proportion by weight of the copolymer of ethylene and of the second compound in the first and/or second intermediate layer is greater than or equal to 10% and less than 50%,
the thickness of said first or second intermediate layer is less than 15% of the total thickness of the film, and
the free shrink of the film is greater than 30% at 93° C.

* * * * *

UNITED STATES PATENT AND TRADEMARK OFFICE
CERTIFICATE OF CORRECTION

PATENT NO. : 8,475,896 B2 Page 1 of 1
APPLICATION NO. : 11/988118
DATED : July 2, 2013
INVENTOR(S) : Josyane Bonetti-Riffaud It is certified that error appears in the above-identified patent and that said Letters Patent is hereby corrected as shown below:

Title Page: Item 75 should read -- Josyane Bonetti-Riffaud --

Signed and Sealed this
Seventeenth Day of September, 2013

Teresa Stanek Rea
*Deputy Director of the United States Patent and Trademark Office*